United States Patent
Vestgöte

(10) Patent No.: US 10,649,997 B2
(45) Date of Patent: May 12, 2020

(54) METHOD, SYSTEM AND COMPUTER PROGRAM PRODUCT FOR PERFORMING NUMERIC SEARCHES RELATED TO BIOMETRIC INFORMATION, FOR FINDING A MATCHING BIOMETRIC IDENTIFIER IN A BIOMETRIC DATABASE

(71) Applicant: Örjan Vestgöte Technology AB, Målilla (SE)

(72) Inventor: Örjan Vestgöte, Målilla (SE)

(73) Assignee: Örjan Vestgöte Technology AB, Målilla (SE)

( * ) Notice: Subject to any disclaimer, the term of this patent is extended or adjusted under 35 U.S.C. 154(b) by 249 days.

(21) Appl. No.: 15/571,712

(22) PCT Filed: May 4, 2016

(86) PCT No.: PCT/EP2016/060086
§ 371 (c)(1),
(2) Date: Nov. 3, 2017

(87) PCT Pub. No.: WO2016/177830
PCT Pub. Date: Nov. 10, 2016

(65) Prior Publication Data
US 2018/0157712 A1    Jun. 7, 2018

(30) Foreign Application Priority Data
May 6, 2015   (EP) .................................... 15166575

(51) Int. Cl.
*G06F 16/2453*   (2019.01)
*G06F 16/22*   (2019.01)
(Continued)

(52) U.S. Cl.
CPC .... *G06F 16/24549* (2019.01); *G06F 16/2282* (2019.01); *G06F 16/24554* (2019.01); *G06F 16/902* (2019.01); *G06F 16/90344* (2019.01)

(58) Field of Classification Search
CPC .................................................. G06F 16/24549
(Continued)

(56) References Cited

U.S. PATENT DOCUMENTS 6,711,562 B1   3/2004 Ross et al.
6,839,703 B2 *  1/2005 Jinzaki .................. G06F 16/902
                                                       707/999.101
(Continued)

FOREIGN PATENT DOCUMENTS

| EP | 1 156 432 A2 | 11/2001 |
| WO | WO 01/65418 A1 | 9/2001 |
| WO | WO 2008/030166 A1 | 3/2008 |

OTHER PUBLICATIONS

Notification Concerning Availability of the Publication of the International Application corresponding to European patent application No. PCT/EP2016/060086 dated Nov. 10, 2016.
(Continued)

*Primary Examiner* — Pierre M Vital
*Assistant Examiner* — Andrew N Ho
(74) *Attorney, Agent, or Firm* — Jenkins, Wilson, Taylor & Hunt, P.A.

(57) ABSTRACT

A method and system for performing numeric searches related to biometric information, the method comprising generating a main search key representing biometric features of an item to be searched, partitioning the main search key into at least two sub-keys, each sub-key comprising a predetermined number of bits, obtaining a set of index tables each comprising a plurality of key values, each key value being associated with a corresponding index value, wherein
(Continued)

the number of index tables in the set is equal to the number of sub-keys within the main search key, identifying, in a first one of said set of index tables, at least one key value matching a first sub-key of the main search key, obtaining, for each identified key value, a corresponding index value pointing to a limited portion of key values in a next index table, identifying, in said limited portion of said next index table, at least one key value matching a next sub-key of the main search key repeating the steps of obtaining index values and searching a limited portion of a next index table until all sub-keys of the main search key have been searched, returning a result when the last sub-key of the main search key has been searched.

5 Claims, 5 Drawing Sheets

(51) Int. Cl.
*G06F 16/2455* (2019.01)
*G06F 16/903* (2019.01)
*G06F 16/901* (2019.01)

(58) Field of Classification Search
USPC .......................................................... 707/715
See application file for complete search history.

(56) References Cited

U.S. PATENT DOCUMENTS

| 2002/0055915 | A1* | 5/2002 | Zhang | G06K 9/62 |
| | | | | 707/999.001 |
| 2006/0104493 | A1* | 5/2006 | Hsieh | G06K 9/00093 |
| | | | | 382/125 |
| 2011/0314285 | A1* | 12/2011 | Hirata | G06F 21/32 |
| | | | | 713/170 |
| 2012/0130983 | A1 | 5/2012 | Ryan et al. | |

OTHER PUBLICATIONS

Notification of Transmittal of the International Search Report and the Written Opinion of the International Searching Authority, or the Declaration corresponding to European patent application No. PCT/EP2016/060086 dated Jun. 30, 2016.

International Preliminary Report on Patentability corresponding to international patent application No. PCT/EP2016/060086 dated Nov. 7, 2017.

Notification Concerning Transmittal of International Preliminary Report on Patentability (Chapter I of the Patent Cooperation Treaty) corresponding to international patent application No. PCT/EP2016/060086 dated Nov. 16, 2018.

Extended European search report corresponding to European patent application No. 15166575.9 dated Oct. 20, 2015.

Office Action (Communication pursuant to Article 94(3) EPC) corresponding to European patent application No. 15 166 575.9 dated Mar. 16, 2016.

* cited by examiner

| byte 0 | byte 1 | byte 2 | byte 3 | Byte 4 |

| Subkey 1 | | | | | | | | | |
|---|---|---|---|---|---|---|---|---|---|
| 255 | 65280 | | | | | | | NULL | |
| 254 | db65024 | db65025 | | | | | | NULL | |
| 253 | db64768 | db64769 | db64770 | | | | | NULL | |
| 252 | db64512 | db64513 | db64514 | db64515 | | | | NULL | |
| | | | | | | | | NULL | |
| | | | | | | | | NULL | |
| 1 | db256 | db257 | db258 | db259 | dn260 | | db509 | NULL | db511 |
| 0 | db0 | db1 | db2 | db3 | db4 | | db253 | NULL | db255 |
| | 0 | 1 | 2 | 3 | 4 | | 253 | 254 | 255 |

Subkey 0

Fig. 6

METHOD, SYSTEM AND COMPUTER PROGRAM PRODUCT FOR PERFORMING NUMERIC SEARCHES RELATED TO BIOMETRIC INFORMATION, FOR FINDING A MATCHING BIOMETRIC IDENTIFIER IN A BIOMETRIC DATABASE

CROSS REFERENCE TO RELATED APPLICATIONS

This application is a national phase filing in the United States pursuant to 35 U.S.C. Section 317 and claims the benefit of PCT International Patent Application Serial No. PCT/EP2016/060086, filed May 4, 2016, which claims the benefit of European Patent Application Serial No. 15166575.9, filed May 6, 2015, the disclosures of which are incorporated herein by reference in their entireties.

TECHNICAL FIELD

The present invention relates to a method, system and computer program product for performing numeric searches related to biometric information.

BACKGROUND

Biometric information is used in a large number of applications today. Biometric identifiers such as fingerprints, palm prints, iris representations, face recognition, DNA, voice samples etcetera may be used for several purposes such as identification, authentication and so on.

When generating data representations of such information it often results in very large amounts of data. Data tables larger than 25 GByte are not uncommon. Searching within such databases comprising biometric information may therefore be time consuming as well as demanding a high level of processing power.

Traditionally, searching within biometric databases is performed by using numeric search keys within sorted index tables. Other types of search algorithms occur, for example linear search where the key is tested against entry values stored in the index table using an index, or pointer, incrementing or decrementing the index or pointer with a step of 1 until one or more matching entries are found or until all entries in the index table until the whole index table is searched without any matching entries. Often the tables are placed in a main memory able to comprise large amounts of data. Modern computers and servers often have access to several related processing units (cores) each comprising a small area of fast memory, so called cache memory. In addition, a main memory such as a common Random Access Memory (RAM) may be shared by the related processing units. Since cache memories are limited in terms of memory capacity, performing searches within large data volumes is time consuming given that the searches need to be redirected to the main memory. A plurality of simultaneously or almost simultaneously occurring inquiries, originating from threads executing in different cores, to a main memory may significantly degrade the performance of a computer or server comprising the main memory.

For example, a modern processor like the Intel i7 or similar may comprise 4 cores each having an 8 MB cache memory and a shared main memory of 32 GB. A database comprising biometric information may be of a size around 20 GB or sometimes more. An index table comprising main key values is associated with the database. Each main key value is associated with an index value pointing to information comprised in the database. A main search key typically comprises 32 bits, but may be smaller or larger than that. For performing a search relating to biometric information typically a numeric search for the 32 bit main search key is performed in the index table. If the index table comprises $10^9$ key values, which is not uncommon when it comes to biometric applications, most of the steps within the numeric search will address the main memory since the size of the memory allocated for key values, indexes and/or related data being searched in every sub step in the search is larger than the size of the cache memory.

Modern CPU's has 3 different types of caches, L1, L2 and L3 caches. Depending on the manufacturers chip design, the L1 cache typically can provide the CPU with data on every clock cycle. The L2 cache may typically be able to feed data to the L1 cache every third cycle, while the L3 cache typically can feed data only every 12 cycles. The three levels exchange data based on CPU needs. For the Intel i7-4770 CPU the L1 data cache is 32 KByte, the L2 cache is 256 KByte, and the L3 cache is 8 MByte.

Finally the main memory can typically feed data to the L3 cache once every 50 cycles or at 2 percent efficiency. That's why it is so important even for a single core application to access memory in such a way that access to main memory is minimized.

The so called bsearch method is implemented in most runtime libraries, for example in Microsoft's C Runtime Library. bsearch, applied on a sorted array of records, operates in such a way that the array is stepped through with a step size initially equal to half of the array size. For each step forwards or backwards in the sorted array the step size is divided by 2. Applications using array sizes larger than the cache sizes will degrade performance, due to the CPU having to wait for data to be fed from main memory. The larger the array size, the more the application will suffer from such degradation.

Large servers may comprise as many as 64 or 128 cores or more. The performance of such servers when performing numeric searches in large databases will be significantly degraded, not only because of the cores having to wait for data from main memory as described above, but also when inquiries in search threads, executing in parallel in the same core, or in other cores, collide when accessing addresses not contained in the cache memories of the cores.

The memory space within a cache memory is shared between memory code and data. The address space contained within the cache memory is normally not under software control.

A method and system for matching two biometric images is described in US 2006/0104493 A1. An index table is generated for a first biometric image. A second image is selected and a number of patterns for each minutia of the second image are generated. Searching for matching patterns is then performed by usage of the generated pattern for each minutia to address the generated index table and then generating a match score for the second image.

In U.S. Pat. No. 6,711,562 B1 cache sensitive search tree (CSS-tree) index structures for improving search performance are disclosed. A search tree index system and method for locating a particular key value stored in a sorted array of key values is described.

Further prior art is known from WO 2008/030166, disclosing a method for searching a database comprising data related to a plurality of fingerprints and EP 1156432 disclosing an apparatus, data structure and recording medium for data retrieval by accessing retrieval tables.

Another method for accessing information based on high speed indexing is disclosed in WO 01/65418 A1. A search string, in this case an URL or URI, defining a resource, such as an image, a document or similar, is divided into segments, a mathematical operation is applied to each segment and the resulting numerical values, i.e. the key, are used as indexes in lookup-tables. One drawback of using lookup tables is that all possible values must be represented in the index tables. For example if the key value is 8 bits, the table size must be $2^8$ entries. If MD5, as mentioned in WO 01/65418 A1, is used to produce the key value, tables of size $2^{128}$ must be used, which is practically impossible. Apart from MD5, other methods, such as CRC4, CRC8 and CRC12 are mentioned for producing the keys. None of these other methods guarantees that 2 different input strings do not generate identical keys as result. If identical keys are derived from different strings, means must be added to distinguish the correct resource before returning the result of the search. These drawbacks, table size and key uniqueness, leads to performance degradation. Further, WO 01/65418 A1 performs a 1:1 search.

SUMMARY

It would be advantageous to achieve a method for performing numeric searches overcoming, or at least alleviating, the above mentioned drawbacks when accessing sorted data structures larger than the cache sizes. In particular, it would be desirable to enable time-efficient searching within biometric information.

To better address one or more of these concerns, a method, system and computer program product including the features defined in the independent claims are provided. Preferable aspects are defined in the dependent claims.

According to a first aspect a method for performing numeric searches related to biometric information is provided. The method comprises generating a set of main search keys, each key representing a biometric feature of an item to be searched, partitioning each of the main search keys into at least two sub-keys, each sub-key comprising a predetermined number of bits, obtaining a set of index tables each comprising a plurality of key values, each key value being associated with a corresponding index value, wherein the number of index tables in the set is equal to the number of sub-keys within the main search key, identifying, in a first one of said set of index tables, at least one key value matching a first sub-key of the main search key, obtaining, for each identified key value, a corresponding index value pointing to a limited portion of key values in a next index table, identifying, in said limited portion of said next index table, at least one key value matching a next sub-key of the main search key, repeating the steps of obtaining index values and searching a limited portion of a next index table until all sub-keys of the main search key have been searched, returning a result when the last sub-key of the main search key has been searched.

A main search key may be seen as a sequence of bits and/or bytes either disclosing a number of sub keys representing separate features or as a sequence of bits/bytes resulting from some operation performed for example on a character or byte string. A number of operations may be performed when generating the search key or for modifying an already obtained key. The main search key may be partitioned into a number of sub-keys. Hence, a sub-key is a part of the main search key comprising one or more bits from the main search key. The first sub-key comprises at least the initial bit of the main search key. The number of bits in each sub-key may vary.

The first aspect is based on the realization that dividing index tables into several tables as well as performing partitioning of a main search key into sub-keys may facilitate time-efficient searches within large amounts of data, such as in the field of biometrics. Finding matching records to a main search key may be achieved by dividing the key into several sub-keys which are being compared to key values within a plurality of following index tables. If a matching key value to a sub-key is found in a table, an index value corresponding to the key value gives a pointer to a limited portion of key values in the next table. In that manner, searching for sub-keys may be performed only within a limited portion of key values which facilitates the search being executed within a memory of limited size, which is often the case with local memory resources such as cache memories. The cache memory can for example have a size of 8 MB.

Hence, by such a method it is possible to carry out numeric searches in a time-efficient manner by using limited high speed memories, facilitating high performance and high degree of user-friendliness.

Further, the aspects disclosed herein may be used for facilitating numeric searches beyond biometric information, concerning other types of data where the amount of information is very large.

The current application describes a method to indirectly affect the use of limited memory resources, such as cache, in such a way that performance degradation, due to for example cache misses and possibly RAM collisions, is minimized.

The main search key may comprise a sequence of bits and each sub-key generated in the partitioning of the main search key is a subset of the bits in the main search key.

The method may be repeated for each main search key within the set of main search keys, together representing a biometric identifier such as a fingerprint, palm print, iris representation, DNA or similar. Often, a plurality of search keys is generated for a biometric identifier such as from an image of a fingerprint, each key representing a feature or features belonging to the identifier. Therefore, for finding the most probable match a number of main keys need to be searched. Hence, in biometric databases, a multitude of identical keys must be allowed, since several biometric features, each described by a key, can be found in one or several person's data. On the other hand, if the biometric features do not result in all possible numerical values being present, the index tables will be smaller, if the tables are being used for numeric search, instead of being used as lookup tables.

The first sub-key of the main search key may comprise the most significant bits and the last sub-key of the key comprises the least significant bits. Thereby, a first step in the search concerns the most significant bits.

The main search key may be generated based on a readable sentence, a readable word and/or at least one numerical factor. It may comprise characteristics describing a specific point within a biometric image, a so called feature point. For example, the characteristics may describe the specific feature point in terms of how it is positioned in relation to at least one neighbouring feature point.

Generating the main search key may further comprise at least partly interleaving a plurality of bits comprised in the key.

The range of a limited portion may be defined by an obtained corresponding index value and an additional index value. The pointer from a matching key value associated with an index value in a foregoing table points to the starting point for searching in the following table, hence determines the starting point of the limited portion. An additional index value from the foregoing table points to the end point of the limited portion. So, the range of a limited portion is defined by an index value associated with a matching key value, as well an additional index value, from the foregoing index table.

The size of the first index table and the size of each limited portion, except the limited portion corresponding to the last sub-key, may be at most two to the power of number of bits in the corresponding sub-key. Hence, the number of bits in each sub-key determines the maximum number of entries having to be searched for a match to the corresponding sub-key. Due to the occurrence of duplicated keys, the limited portion corresponding to the last sub-key may be smaller than, larger than or equal to two to the power of number of bits in the last sub-key.

For example, a predetermined number of bits of the first sub-key is X, wherein X=[1 . . . 64], preferably X=[1 . . . 16] or X=[1 . . . 8] and the first index table comprises at most $2^X$ values, and a predetermined number of bits of the next sub-key is Y, wherein Y=[1 . . . 64], preferably Y=[1 . . . 16] or Y=[1 . . . 8], and the limited portion of the next index table, except the limited portion corresponding to the last sub-key, comprises at most $2^Y$ values, thereby minimizing the number of memory accesses needed for the step of identifying a key value matching the first sub key in the first table of said set of index tables and for the step of searching the limited portion of a next index table. Hence, by the predetermined number of bits in each sub-key being limited to at most 64 bits, preferably 16 or 8 bits, the size of the index tables are limited and the memory accessed needed for finding a match for a sub-key in a corresponding table required are minimized.

Some examples of ranges of X and Y are: X=[1 . . . 15, 17 . . . 64], preferably X=[1 . . . 15], Y=[2 . . . 7, 9 . . . 64], preferably Y=[2 . . . 7, 9 . . . 16]. Additionally, X may be equal to 16 and Y may be equal to 8. X may be smaller than Y, or equal to or larger than Y, preferably X>Y, X=Y, Y=X/2 or Y=X/4.

In the current method numeric search is used in at least the last index table, allowing for identical keys belonging to the same person or different persons. Typically, a flat fingerprint, or a rolled fingerprint will produce several hundreds of main search keys. A latent fingerprint, i.e. a fragment of a full or rolled print collected during a criminal investigation, can contain as low as 5-10 main search keys.

The returned result may be a resulting set of records. The result set obtained may be empty or contain one or more matching records. A biometric feature, most likely results in a multitude or large number of found features, hence a 1:N search, where N is the set of found features resulting from one or several persons. Consequently, an input set of biometric features will result in an output set N of database records, where N is equal to zero, or greater than zero.

The method along with additional processes may be simultaneously executed on a single processing unit. Parallel execution on the same processing unit, core, may require cache memory being shared and consequently leads to performance degradation. However, when using the method disclosed above, parallel execution on the same core is made possible due to the search being able to be executed within a memory of limited size, such as a cache memory of a size of 8 MB.

The index tables may be used as look-up tables. Each index table may be a sorted index table.

According to a second aspect a system for performing numeric searches related to biometric information is provided. The system comprises at least one processing unit comprising local memory resources, the processing unit being adapted for receiving and/or generating main search keys wherein each main search key is partitioned into at least two sub-keys, each sub-key comprising a predetermined number of bits, a main memory connected to the at least one processing unit, the main memory comprising a biometric information database, index tables comprising key values, each key value being associated with a corresponding index value, wherein the number of index tables is equal to the number of sub-keys within a main search key that is to be searched, the index values in said index tables pointing to limited portions of key values in a next index table and the index values in the last index table pointing to positions in the biometric information database.

The range of a limited portion may be defined by an obtained corresponding index value and an additional index value.

The size of the first index table may at most be two to the power of number of bits in the first sub-key. Also, the size of each limited portion, except the limited portion corresponding to the last sub-key, is at most two to the power of number of bits in the corresponding sub key. Hence, the number of bits in each sub-key determines the number of entries having to be searched for a match to the corresponding sub-key. The predetermined number of bits of each sub-key may be as disclosed above in relation to the described method.

For example, a predetermined number of bits of the first sub-key is X, wherein X=[1 . . . 64], preferably X=[1 . . . 16] or X=[1 . . . 8] and the first index table comprises at most $2^X$ values, and a predetermined number of bits of the next sub-key is Y, wherein Y=[1 . . . 64], preferably Y=[1 . . . 16] or Y=[1 . . . 8], and the limited portion of the next index table, except the limited portion corresponding to the last sub-key, comprises at most $2^Y$ values, thereby minimizing the number of memory accesses needed for the step of identifying a key value matching the first sub key in the first table of said set of index tables and for the step of searching the limited portion of a next index table. Hence, by the predetermined number of bits in each sub-key being limited to at most 64 bits, preferably 16 or 8 bits, the size of the index tables are limited and the memory accessed needed for finding a match for a sub-key in a corresponding table required are minimized.

Some examples of ranges of X and Y are: X=[1 . . . 15, 17 . . . 64], preferably X=[1 . . . 15], Y=[2 . . . 7, 9 . . . 64], preferably Y=[2 . . . 7, 9 . . . 16]. Additionally, X may be equal to 16 and Y may be equal to 8. X may be smaller than Y, or equal to or larger than Y, preferably X>Y, X=Y, Y=X/2 or Y=X/4.

The system may further comprise an output unit for outputting biometric information resulting from numeric searches performed in the system. It may also comprise an interface for communicating information to a user so that results from a performed biometric search may be presented to the user.

The local memory resources may comprise at least one cache memory which may have a size of 8 MB.

According to a third aspect, a computer program product is provided, comprising computer program code portions adapted to perform the method described herein when executed on a processing unit.

BRIEF DESCRIPTION OF THE DRAWINGS

This and other aspects will now be described in more detail in the following illustrative and non-limiting detailed description, with reference to the appended drawings.

FIG. 6 shows a schematic representation of an index table according to an aspect of the present application.

DETAILED DESCRIPTION

Figures 1A, 1B:
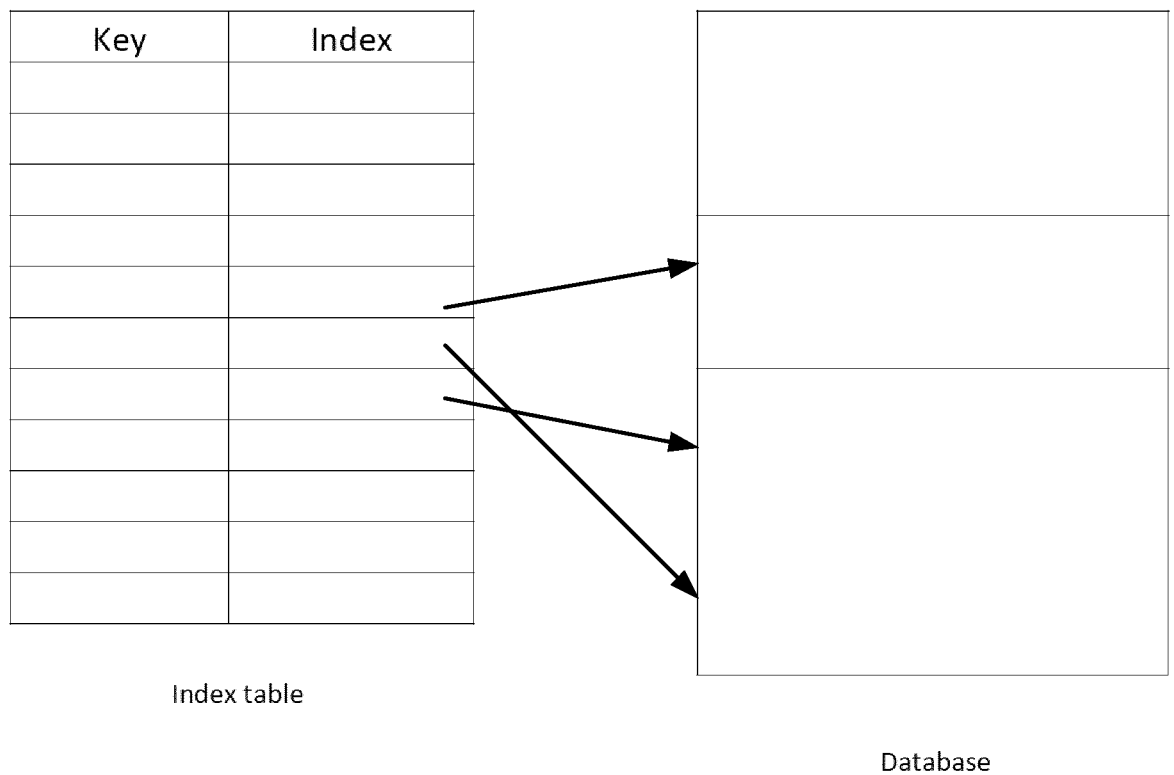
FIG. 1a shows an index table referring to a database residing in RAM or on a secondary memory according to the prior art.
FIG. 1b shows a database with key values stored in connection with database records according to the prior art.

According to the prior art, performing numeric searches in large databases such as databases comprising biometric information is performed by using sorted index tables. An example of such an index table related to a database is seen in FIG. 1a. The index table comprises a number of key values and every key value is associated with an index value, the index values pointing to information comprised within the database. Note that the number of keys and index values in FIG. 1a is limited for illustrative purposes only. The number of key values comprised in an index table concerning biometric information searches may be up to $10^9$ or even more.

According to prior art, a match for a main search key is searched for among the key values within the index table. When a match for the main search key is found the corresponding index value points to biometric information records within the biometric database, and thereby relevant biometric information may be obtained such as a number of possible matches.

Another example of how biometric information may be stored in a database according to the prior art is seen in FIG. 1b. In this case, the key values are stored in direct connection to the biometric data in a main memory, such as a RAM. As mentioned before concerning FIG. 1a, the key value and data fields in FIG. 1b are limited for illustrative purposes only. In the example illustrated in FIG. 1b, there is no need for having index values and pointers to the biometric data since the key values themselves are already associated with the relevant data. However, searching within such databases comprising large amounts of biometric data is time consuming.

A main search key may be obtained in a number of ways depending on the circumstances. If a search for a specific word or sentence, i.e. a string of characters, is to be performed, one or more main search keys may be obtained by applying a hash algorithm which may give one or more search keys each comprising for example a 32 or 64 bit number. If the object to be searched already comprises numerical objects one or more main search keys may be obtained by joining the numerical objects. A hash algorithm or similar may be used also on numerical search objects or on an obtained search key for example for compressing the data. Note that other methods known to a person skilled in the art for obtaining main search keys may be used. Also, generating a main search key may comprise at least partly interleaving a plurality of bits comprised in the key.

The aspects in this application concern searching within biometric information which refers to information related to individual characteristics. Examples of such characteristics include, but are not limited to: fingerprints features of the face, DNA, palm prints, hand geometry, iris or retina aspects, scent, voice, gait, handwriting and so on.

As an example, generating a set of main search keys representing characteristics of a fingerprint will be briefly described. An image of a fingerprint is generated by using an appropriate imaging device. A reference feature point in the image may be described by relating it to neighbouring feature points. The reference feature point has a position described for example by x/y-coordinates and a direction. Feature points within a predefined radius of the reference feature point may thus be described by polar coordinates, i.e. by distance and angle from the reference feature point. A main search key representing the reference feature point may therefore be obtained by including the relationship to a number of neighbouring feature points expressed in terms of angle and distance. For limiting the size of the key a few neighbouring feature points may be used. Further, the size may be reduced by only using the shortest and longest neighbor distances respectively. Also, a hash algorithm may be used for compressing a generated key.

Consequently, for matching a fingerprint against stored fingerprints in a database a set of main search keys has to be generated for a number of reference feature points within an image of the fingerprint, and then matched against stored keys. The fingerprint within the database resulting in the largest number of hits when the set of main search keys have been searched is the most likely candidate for a match.

Aspects of the present application will be described below in relation to FIG. 2-4.

A main search key may be seen as a sequence of bits and/or bytes either disclosing a number of sub keys representing separate features or as a sequence of bits/bytes resulting from some operation performed for example on a character or byte string. As mentioned above, a number of operations may be performed when generating the search key or for modifying an already obtained key. An example of a main search key is shown in FIG. 2. The key in FIG. 2 comprising 5 bytes, i.e. 40 bits. Note that the key may comprise more or less than 5 bytes. The first byte may comprise the most significant bits and the last byte the least significant bits, but it is not necessary.

The main search key may be partitioned in an appropriate number of sub-keys. For example, a first sub-key may comprise a partition of 16 bits, i.e. byte 0 and byte 1, a second sub-key may comprise byte 2, a third sub-key byte 3 and a forth sub-key byte 4. This is just an example of how to partition the key. It may be performed in a number of ways depending on the circumstances such as size of the key, cache memory size and so on.

An index table, such as the one shown in FIG. 1a, is divided into a number of tables by splitting the key values comprised therein into a number of parts, the number of parts corresponding to the number of sub-keys of the search key. So, in the case mentioned above with a key being partitioned into four sub-keys, the key values are split into four parts and thereby the number of index tables is four, instead of one large index table comprising all key values. Hence, the number of sub-keys is equal to the number of index tables.

Each sub-key corresponds to an index table in the corresponding order as they appear in the main search key. Hence, the first sub-key of the main search key, i.e. the sub-key comprising at least the initial bit of the main search key, corresponds to a first table (Table1), the second sub-key corresponds to a second table (Table2) and so on, depending on the number of sub-keys.

The maximum size of the first index table, and the size of a limited portion that is to be searched in each table following the first table, except for the limited portion corresponding to the last sub-key, corresponds to the number of bits in the corresponding sub-key. The size of the first table, and the size of each limited portion, is expressed as the number of entries that are to be searched when finding a match to a respective sub-key.

For each table the maximum size corresponds to the number of bits in the respective sub-key in that the maximum size for an N:th index table is $(2^{N1})*(2^{N2})*(2^{N3}), \ldots *(2^{NN})$ where N1, N2, N3 . . . NN is the number of bits in the first, second, third . . . N:th sub-key. For example, if a main search key is divided into three sub-keys each having 8 bits, the size of the first index table is at most $(2^8)^1=256$ entries, the size of the second index table is at most $(2^8)^2=256*256$, and the size of the third index table is at most $(2^8)^3=256*256*256$. If the first sub-key is 16 bits, and the following second and third sub-keys are 8 bits each, the size of the first index table is at most $(2^{16})=65536$ entries the size of the second index table is at most $(2^{16})*(2^8)=65536*256$, and the size of the third index table is at most $(2^{16})*(2^8)*(2^8)=65536*256*256$. Hence, the sizes of index tables grow large and performing a search for matches within such large tables requires large capacity in terms of memory and processing capability.

When the portion to be searched is limited in terms of number of entries, the search for a matching value to each sub-key can be performed efficiently. Keeping the number of bits in each sub-key to a limited number also limits the range of values to be searched. Therefore, when a search is performed for a matching value to a sub-key, the search is restricted to a limited amount of entries in each table and hence minimizing the number of memory accesses needed is obtained. Thereby, the search may be performed in a memory having limited capacity such as cache memory.

The number of bits in the first sub-key is X. Hence, for the first index table the number of entries (values) to be searched is at most $2^X$. As mentioned, X may vary from 1-64 bits, but is preferably in the range from 1-16 or 1-8 bits.

Figures 2, 3:
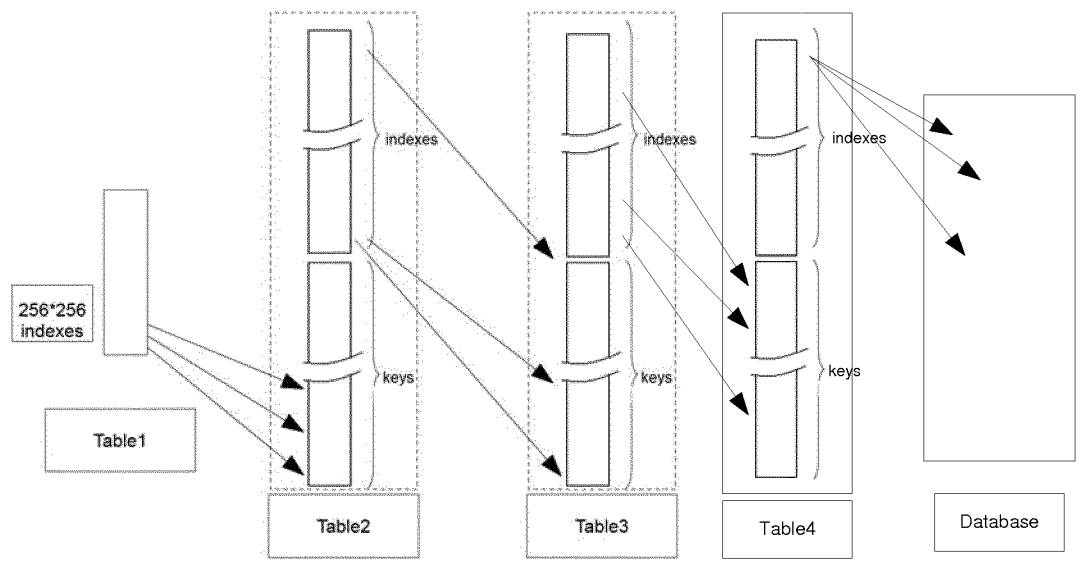
FIG. 2 shows a schematic representation of a main search key partitioned into several parts.
FIG. 3 shows a schematic representation of steps in a method for performing numeric searches according to an aspect of the present application.

A divided index table is shown in FIG. 3. If, as in the example given above, the first sub-key of the main search key comprises 16 bits Table 1 will comprise $2^{16}=65536$ entries. However, the first sub-key, or any of the other sub-keys, may comprise less than 16 bits, usually 8 bits. In that case, the table corresponding to a sub-key comprising 8 bits would comprise $2^8=256$ entries.

If Table 1 is of size 65536 entries, Table 1 needs only hold the index values pointing to Table 2, and thus can be used as a simple lookup-table. If Table 1 is smaller than 65536 and the key size is 16 bits, Table 1 must contain both key and associated index values. A numeric search performed among these values may, due to the limited size of Table 1, be performed within cache memory.

Similarly if the first sub-key is 8 bits wide, a corresponding table has the size of at most 256 entries. If the table has 256 entries, the table can be used as a lookup table. If a sub-key value is not present in the database, this nonexistent key can be represented by a pointer value NULL, or any other value not present in the database. It is also possible, however more time consuming, to restrict the content of the first index table to only those values present in the database. This saves a negligible amount of memory, but uses more time consuming numeric search. However, when the sizes of index tables increases with lesser significant sub-keys, the increased amount of memory required for lookup tables, might no longer be negligible, and in those cases numeric search may be the preferred method.

There are reasons for making the limited portions small. For example, using an index table Table 1 as a look-up table makes the size of each entry small, since the entries only contain an index value to the next table. Keeping the limited portions as small as possible, minimizes the number of memory accesses not contained in the cache. In addition, parallel execution on the same processing unit (core) of other threads or processes requires that the cache is shared with those threads or processes. If the memory elements, accessed by all parallel activities, are kept smallest possible, the rate of cache misses will consequently be kept lowest possible, in turn keeping the overall performance at a higher level.

Also, for reducing the number of entries, of index tables according to FIG. 3 compared to FIG. 1a and FIG. 1b, the keys are unique in all limited portions, except for the limited portion in the last table, which may contain duplicated key values. If different persons have the same biometric feature, or one person has two or more identical features located at different positions. Such biometric features may be represented by identical main search keys. When splitting the main search key into sub-keys, for example 4 sub-keys, the sequence of sub-keys will be identical. However, to retrieve all persons with this biometric feature, the limited portion in the last index table must contain duplicated sub-key values, each with a database reference to the different persons. Hence, duplicated values are required when the biometric feature, represented by the sub keys for the feature, are derived from different persons, or when identical biometric features are found at different positions derived from the same person.

The matching key values are associated with index values pointing to key values within the next table, Table 2. Searching for the next sub-key in the search key, which in the example above is byte 2, will be performed only within a limited section in Table 2, the limitation being determined by the key values being pointed to by the index values from the previous table, Table 1. The arrows in FIG. 3 represent pointers from index values to key values in the next table. The same procedure is repeated for all sub-keys of the main search key. When searching for matching key values of byte 2 in Table 2 the search is only performed within the previously mentioned limited portion.

A limited portion is limited by pointers from the foregoing table. The pointer from a matching key value associated with an index value in a foregoing table points to the starting point for searching in the following table, hence determines the starting point of the limited portion. An additional index value from the foregoing table points to the end point of the limited portion. Preferably, a pointer from a matching key value associated with an index value in a foregoing table+1 determines the end point of the limited portion since the matching key value+1 in the index table is associated with an index value pointing to the first entry in the next table that is not to be included in the limited portion to be searched. Hence, the index value following an index value associated with a matching key value may determine the end point of the limited portion. Consequently, the range of a limited portion is defined by an index value associated with a matching key value, as well an additional index value, from the foregoing index table.

Index values associated with matching key values in Table 2 point to key values in the next table, Table 3. A search for the third sub-key of the search key, byte 3, is performed within the limited portion of key values in Table 3 determined by the index values from the previous table, Table 2. A corresponding search is performed in Table 4 concerning the last sub-key of the main search key, in the example represented by byte 4.

Figure 4:
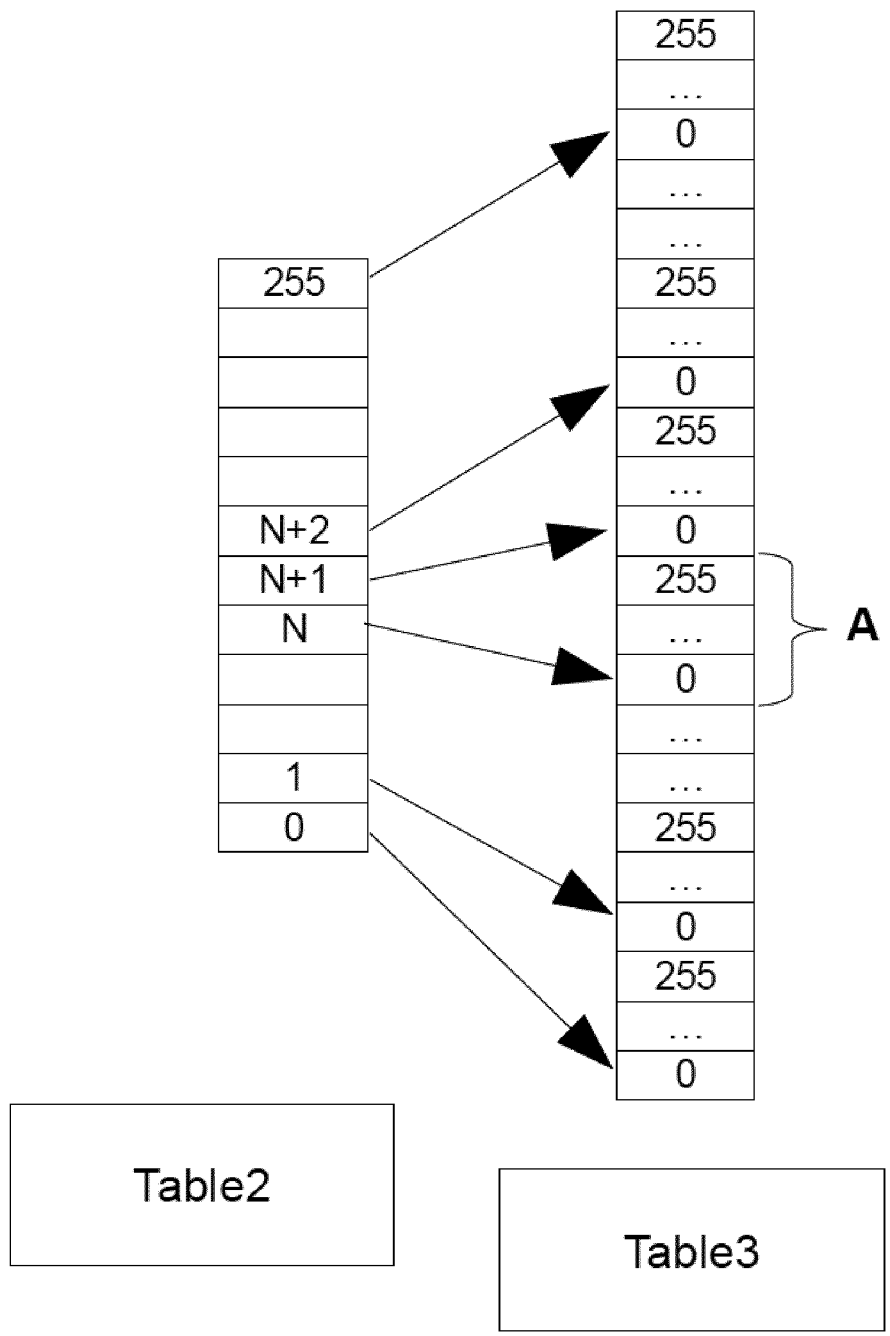
FIG. 4 shows a schematic representation concerning further details of steps in a method for performing numeric searches according to an aspect of the present application.

An example of how Table 2 and Table 3 are related is shown in FIG. 4. An index value obtained from a match in Table 1 has limited the search to a portion comprising 256 entries (values) in Table 2, provided sub-key 2 is 8 bits. A match for the second sub-key of the main search key, i.e. byte 2, is found in the key value N. Key value N is associated with an index value pointing to the starting point of a limited portion A within Table 3. The key value N−1 is associated with an index value pointing to the first entry point in Table 3 that is not to be included in the limited section A.

Thus, a limited portion A ranges from an entry pointed to by a pointer from the index value corresponding to a matching key value N in the foregoing index table up to, but not including, an entry pointed to by a pointer from the index value corresponding to a matching key value plus one, N+1. Since in the example of FIG. 4, the sub-keys comprise 8 bits, the limited portion pointed to by a match in the previous table is 256 entries, since $2^8=256$. A search within such a limited section may thus be performed in a small memory area such as within a cache memory. Thus, the number of entries in a limited portion A of an index table, where the corresponding sub-key has Y number of bits is $2^Y$. Y, the number of predetermined bits in a sub-key, may as previously mentioned vary from 1-64 bits, but is preferably in the range from 1-16 or 1-8 bits.

The size X of the first sub-key may be equal to the size Y of the following sub-keys, or X may be smaller or larger than Y. Since the first sub-key may comprise the most significant bits, it might preferably be of the same size or larger than the following sub-keys.

If the number of key values in such limited section of a table mentioned above equals 256, and the size of the sub-key is 8 bits, and duplicated keys are not allowed, the table can be used as a lookup table. If the number of values is not 256 for an 8 bit sub-key, then the location of the sub-key must be located, if it exists, using a numeric search. Generally, the following rule for using the index tables as lookup tables, must apply: the size of the index table must be $2^N$, where N is the number of bits in the corresponding sub-key.

The searches within the index tables are performed until the last sub-key of the main search key has been searched. In the example above, the last search is searching for matches for byte 4 within the key values of Table 4. The index value corresponding to a match to the last sub-key within the last table points to records comprised in the biometric database as seen in FIG. 3. Thereby, one or more matching results, in the form of a resulting set of records, regarding biometric information corresponding to the main search key may be obtained. Note that the final index value may point to several positions within the database since the key being searched, representing for example a feature point within a biometric representation, may not be unique. So, several records within the biometric database may be received resulting from a single search for a main search key. The records may for example relate to biometric representations belonging to individuals. If a feature point obtained from an image of a fingerprint is searched for, by using a main search key, a number of possible matches, namely stored fingerprints for known individuals where a feature point having the same features as the one represented by the search key, may be obtained.

Figure 5:
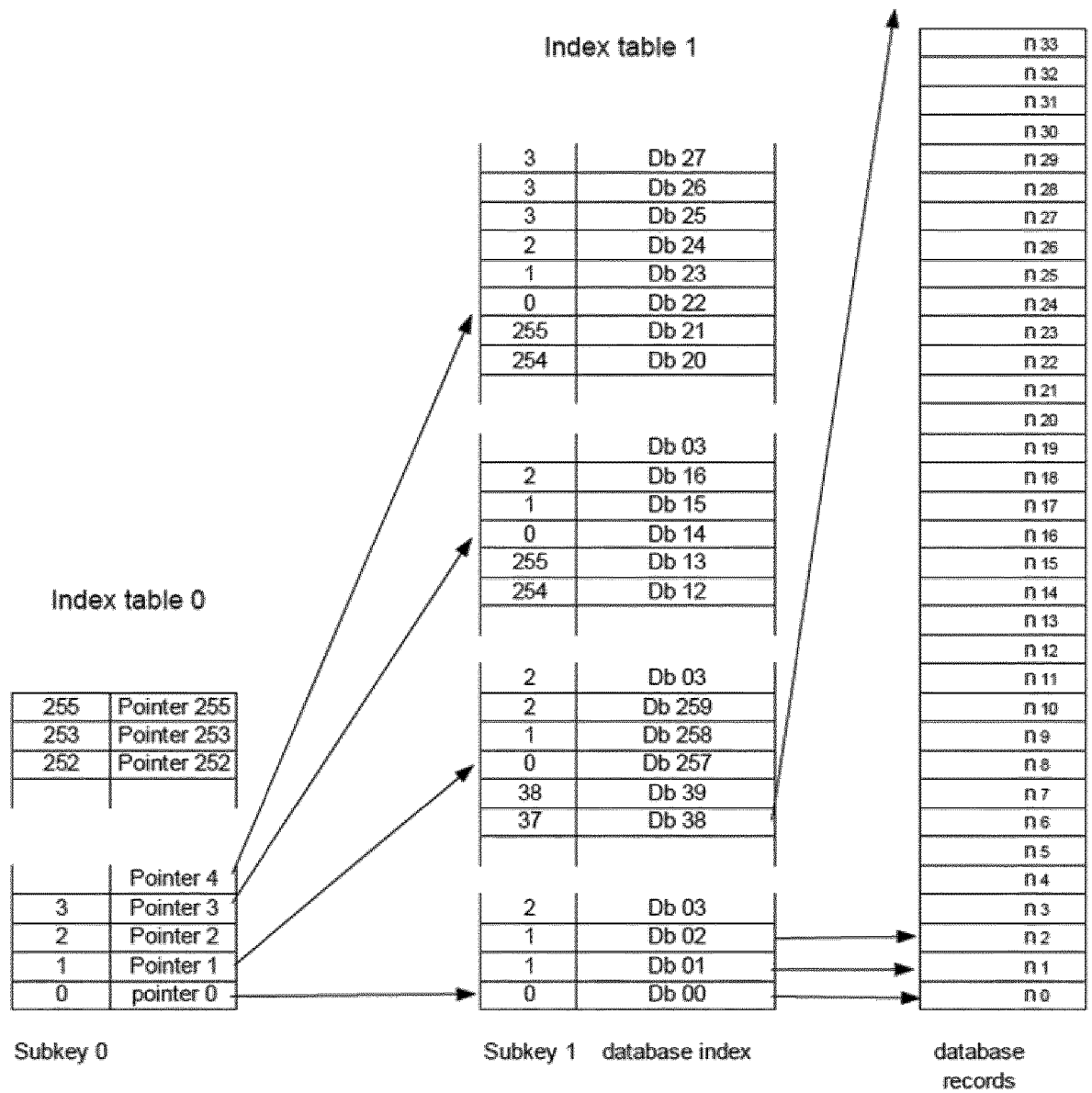
FIG. 5 shows a schematic representation of index tables according to an aspect of the present application.

An example of a first index table (Index table 0) and a second, following index table (Index table 1) as well as a database record is schematically shown in FIG. 5.

Assuming that the main search key is 16 bits, and that the main search key is split into two sub-keys, a first (Subkey 0) and a second (Subkey 1) sub-key each of size 8 bits. Assume also that some key values are not represented in the index tables, and some values in the index table (Index table 1) for the second key (Sub-key 1) are duplicated.

Since the size of the first index table (Index table 0) is smaller than $2^8$, due to the missing value 254, numeric search is used to retrieve the corresponding pointer (pointer 0, 1, 2 . . . 255) which points to the start index in the second index table (Index table 1). To minimize the search time, missing key values may be inserted and the corresponding pointer value set to NULL. Hence, the tables can be used as lookup-tables. However, in the last index table, in this example the second index table (Index table 1), corresponding to the least significant sub-key, the limited portion may contain duplicated key values. Thereby, numeric search must be used for the last index table (Index table 1), allowing several database indexes (Db00, Db01, Db02 etc.) to be retrieved for the duplicated sub-key values.

The index tables for the sub-keys may be illustrated as in FIG. 6 as a 2-dimensional array containing a database index (0, 1, 2 . . . 255) for each combination of key values in the first (Subkey 0) and following, second (Subkey 1) sub-key. If there are more than two sub-keys, the index tables, as illustrated in FIG. 6, would have more than two dimensions. For example, three sub-keys results in index tables having three dimensions, four sub-keys results in index tables having four dimensions and so on.

Assuming the key value is 3 for the first sub-key (Subkey 0), the search in the second index table (Index table 1) is limited by the pointer value 3 (Pointer 3) and pointer value 4 (Pointer 4), where pointer 3 is the starting address in the second index table (Index table 1), and pointer 4 is the first address outside the range to be searched.

If 3 sub-keys are used, duplicated key values are no longer allowed in the limited portion of the second index table (Index table 1). Duplicated key values are only allowed in the last index table, in this example the third index table. In the case that all 3 sub-keys are 8-bits wide, the maximum size of the first index table will be 256, the size of the second index table will be 256*256 and the size of the third index table depends on the number of duplicated key values.

Although the maximum size of each index table, starting with 256 for the first table, increases, the search within each of the first and second index tables is limited to maximum 256 values. The size of the limited portion of the last index table depends on the number of duplicated values. However, all of the searches will be within a limited area of each table allowing the search to be performed within a limited memory area such as the cache memory.

In biometric databases, a multitude of identical keys must be allowed, since several biometric features, each described by a key, can be found in one or several persons. On the other hand, if the biometric features do not result in all possible numerical values being present, the index tables will be smaller, if the tables are being used for numeric search, instead of being used as lookup tables.

Therefore, in the current method numeric search is used in at least the last index table when searching for entries matching to the last sub-key, allowing for duplicated keys belonging to the same person or different persons.

As earlier mentioned, several searches based on a set of generated main search keys may have to be performed in order to finally obtain a matching biometric identifier such as a fingerprint, palm print, DNA and so on. The most probable match would have the largest number of hits from the plurality of search keys. When searching for a biometric entity, such as a fingerprint, a number of biometric features are defined, and a set, K, of keys are generated. For a complete fingerprint the number of keys in K is typically several hundreds. For a latent fingerprint, i.e. a fraction of fingerprint collected from a crime scene, the number of keys in K can be as low as 10-20. For each key in the set of keys, K, a set, N, of features is found using numeric search in sorted tables where duplicates are allowed. Each found feature contains a database index representing a person. The union of all found features can be called F. When using the database index to sort F, the most likely person representing K can be found when counting the found keys $F_p$ with identical database index. The most likely person P has the highest value of $F_p$.

A computer system, within which numeric searches related to biometric information are performed, may comprise one or more processing units, such as so called cores, having local memory resources, e.g. cache memories. Also, the system may include one or more main memories connected to, and shared by, the processing units. Databases comprising biometric information are often very large and hence they may be comprised within RAM memories, secondary disk memories or solid state disks. If response time shall be on a user friendly level, RAM memories are the most suitable option.

Results from searches performed may be output by an output unit to local or remote units. For example, resulting sets of records from one or more searches may be forwarded to a user interface for presentation to a user. Before presenting results to a user, additional processing may have been performed. Also or additionally, resulting information may be sent to a remote unit for further processing, storage and so on. Communication within the system may be performed in a number of ways known to a person skilled in the art according to the circumstances. The communication between input/output units, memories, processing units etcetera may for example be wired and/or wireless.

The subject matter of the present application may be realized by using a computer program product, comprising computer program code portions adapted to perform the method disclosed herein when executed on a processing unit. The processing unit may be a single unit or several interconnected processing units. The processing unit may be incorporated in a multi-processor computer system.

The present application describes how to structure index tables containing sorted key values related to database information in such a way that time and memory space needed for searching for keys is reduced.

In the matter of searching through the index tables several methods may be used. A commonly used method is called binary search, which is available for software developers, in for example Microsoft's SDK, under the name bsearch.

During bsearch a step index is calculated. This step index is used when referring to entries in the index table. The first step index equals half of the size of the referred index table. Depending on the comparison result, the step index is incremented or decremented with a delta step equaling half of the current value of the step index. The method is repeated until one or several matching keys are found, or until the deltastep equals zero, when no match is found.

Other methods may also be used, for example linear search, where the search key is compared to each of the keys in an index table, until no more matching keys can be found.

A multitude of other search methods may be designed, which may be a mixture of linear search and the bsearch method. For example, when searching through a sorted index table, with N elements, an initial step index with size N/K, where factor K<N and preferably is less than or equal to N/2, can be used. For example when N=256, K can be 25, or when N=10000, K can be 500, when N is >1000 000 000 K can be 10 000 000. As long as K>1, and no matching key is found, the current index can be decremented if the search is ascending, or incremented if the search is descending, with a delta of at least K−1. K is then reduced by dividing K with a suitable factor, which the developer decides depending on the size of the index table. For example if K is 500, it can be reduced to 50, later to 5 and finally 1, or for simplicity directly from 500 to 1. The latter will cost extra time required for searching matching keys. The algorithm is then repeated with the new value of K until K has reached 0.

Other appropriate methods for searching may also be used depending on the circumstances. The group of possible search algorithms used for searching in sorted index tables is in this application called "numeric searches". Although the subject matter disclosed herein relates to searching within biometric information, it may also be usable for performing numeric searches concerning other types of information. Especially, the aspects disclosed in the application may facilitate numeric searches within databases comprising large amounts of data such as geographic information, meteorology, advanced simulations and so on.

The invention claimed is:

1. A method for performing numeric searches related to biometric information, for finding a matching biometric identifier, such as a fingerprint, palm print, face recognition, DNA or voice sample, in a biometric database, wherein a first index table related to the biometric database comprises a number of first key values, each first key value being associated with a first index value, the first index values pointing to information comprised within the biometric database; the method comprising: (1) generating a set of main search keys, each main search key representing a biometric feature of an item to be searched, characterized in:
    (2) partitioning each of the main search keys into at least two sub-keys, each sub-key comprising a predetermined number of bits,
    (3) obtaining a set of index tables (Table1-Table4, Index table 0, Index table 1) each comprising a plurality of key values, each key value being associated with a corresponding index value, wherein the number of index tables in the set is equal to the number of sub-keys within the main search key,
    (4) identifying, in a first one (Table1 Index table 0) of said set of index tables, at least one key value matching a first sub-key of the main search key,
    (5) obtaining, for each identified key value, a corresponding index value pointing to a limited portion (A) of key values in a next index table, (6) identifying, in said limited portion (A) of said next index table, at least one key value matching a next sub-key of the main search key, (7) repeating the steps of obtaining index values and searching a limited portion (A) of a next index table until all sub-keys of the main search key have been searched, wherein the index value corresponding to a match to a last key within a last index table points to one or more records comprised in the biometric database, wherein one or more matching results regarding biometric information corresponding to the binary search key are obtained, the records relate to biometric identifiers belonging to individuals; and (8) returning a result when the last sub-key of the main search key has been searched; repeating the above steps 1-8 for a plurality of binary search keys together representing the biometric identifier; and obtaining a resulting set of records; wherein the first key values are not unique, such that several records within the biometric database result from a single search for the binary search key, wherein a predetermined number of bits of the first sub-key is X, wherein X=[1 . . . 64], preferably X=[1 . . . 16] or X=[1 . . . 8] and wherein the first index table comprises at most 2X values, and wherein a predetermined number of bits of the next sub-key is Y, wherein Y=[1 . . . 64], preferably Y=[1 . . . 16] or Y=[1 . . . 8], and the limited portion (A) of the next index table, except the limited portion corresponding to the last sub-key, comprises at most 2Y values, thereby minimizing the number of memory accesses needed for the step of identifying a key value matching the first sub key in the first table of said set of index tables (Table1-Table4, Index table 0, Index table 1) and for the step of searching the limited portion (A) of a next index table.

2. The method as claimed in claim 1, wherein X=[1 . . . 7, 9 . . . 15, 17 . . . 64], preferably X=[1 . . . 7, 9 . . . 15].

3. The method as claimed in claim 1, wherein Y=[1 . . . 7, 9 . . . 64], preferably Y=[1 . . . 7, 9 . . . 16].

4. The method as claimed in claim 1, wherein X=16 or X=8 and wherein Y=8.

5. The method as claimed in claim 1, wherein X≥Y or X<Y, preferably X>Y, Y=X, Y=X/2, or Y=X/4.

* * * * *